June 26, 1962   J. E. DALY   3,041,025
CONDUIT CLAMP CUSHION
Filed Sept. 3, 1959
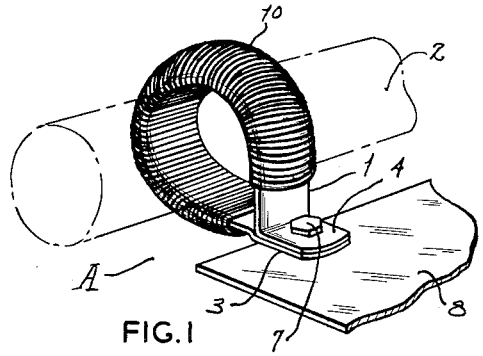
FIG. I
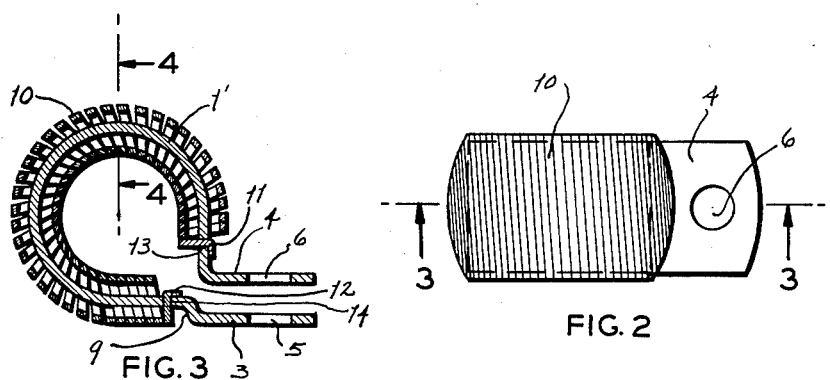
FIG. 3      FIG. 2
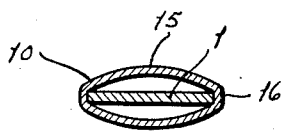
FIG. 4
*INVENTOR.*
JOHN E. DALY
BY Ralph W. Kalish
ATTORNEY

United States Patent Office 3,041,025
Patented June 26, 1962

3,041,025
CONDUIT CLAMP CUSHION
John E. Daly, Crestwood, Mo., assignor to Essex Mfg. Co., Inc., St. Louis, Mo., a corporation of Missouri
Filed Sept. 3, 1959, Ser. No. 837,814
1 Claim. (Cl. 248—74)

This invention relates in general to conduit clamps and, more particularly, to a clamp incorporating novel cushioning means.

Heretofore, various efforts have been undertaken to develop cushioning structures for clamps or clips as utilized for supporting conduits in aircraft, trucks, and other vehicles for fuel, hydraulic fluid, or the like. However, in practice, each of such prior expedients proved to have certain serious limitations, thereby restricting the usage thereof. Such cushioning devices have been constructed of non-metallic materials as being made of fibrous or resilient insulation material, such as asbestos, fiberglass, resinous material or plastics, rubber, or combinations thereof, and being adapted for securement to a clamp, as by an adhesive. These devices have consistently proved lacking in one or more vital properties so that the same are serviceable only under predetermined, particular conditions. Various plastics and resinous materials have demonstrated a reactiveness with certain solvents and fuels which cause disintegration of the devices made therefrom. Furthermore, cushioning structures of the type above discussed have a relatively low heat-resistance (e.g. rubber, whether synthetic or natural, has a tendency to harden and crack at 250° F.) while others are not properly resistant to extreme low temperatures as encountered with liquid oxygen, whereby the same become brittle and crack. From the standpoint of providing the desired resiliency for protecting conduits from damage through the intense vibration to which the same are normally subjected in usage, many plastics and rubber are quite inadequate, since the inherent resiliency thereof is consistently lost through the development of a permanent "set." Additionally, plastics and rubber have proved to disintegrate under nuclear radiation and, hence, are not desirable for utilization within systems exposed to such radiation. Thus, in view of the above, it will be seen that non-metallic cushioning devices have not presented the all-around qualities desirous for use under varying conditions, but rather have clearly shown that each such type has but limited applicability.

Therefore, it is an object of the present invention to provide a cushioning device for disposition upon conduit clamps which has a relatively long resilient life, being resistant to taking a "set"; which is inert to solvents, fuels, and the like; which will not disintegrate under nuclear radiation; and which will not succumb or lose requisite properties under extreme high or low temperatures; and which is thus a cushioning device serviceable for general usage.

It is a further object of the present invention to provide a cushioning device which may be most cheaply manufactured; which may be most efficiently and rapidly engaged upon a conduit clamp, not requiring the utilization of extraneous adhering means, such as adhesives, and the like; and which, though firmly engaging the conduit will not effect any wearing-away of the contacted surface.

It is an additonal object of the present invention to provide a cushioning device for use with conduit clamps which is formed entirely of metal and which is durable and reliable in usage.

Other objects and details of the invention will be apparent from the following description, when read in connection with the accompanying drawing wherein—

FIGURE 1 is a perspective view of a clamp constructed in accordance with and embodying the present invention illustrating the same in operative conduit-engaging condition.

FIGURE 2 is a top plan view.

FIGURE 3 is a vertical section taken on the line 3—3 of FIGURE 2.

FIGURE 4 is a vertical section taken on the line 4—4 of FIGURE 3.

Referring now by reference characters to the drawing which illustrates the preferred embodiment of the present invention, A designates a conduit clamp or support clip which comprises a strip of metal 1 bent to define a substantially closed circle or loop 1' for disposition about a conduit or pipe 2 as used in the fuel or hydaulic systems of airplanes, tanks, trucks, or other vehicles; the ends 3, 4 of said metal strip being in general parallel relationship and having registered openings 5, 6, respectively, for extension therethrough of a bolt 7 or other securing element for engaging clamp A to a convenient portion of the frame or structure of the vehicle, as indicated broadly at 8, for conduit support. The end 3 of clamp A may be offset, as at 9, for receiving the angle formed between the end 4 and the adjacent section of the loop when the ends are in engaged relationship so as to present a snug joint therebetween.

Disposed in a sheath-like manner, about loop 1' of clamp A, is a metallic, coiled spring 10, the ends 11, 12 of which are suitably anchored to clamp A, as by passage of its ends through openings 13, 14 formed in the end portions of loop 1' adjacent clamp end sections 4, 3, respectively. Said spring 10 is close coiled so as to form a substantially continuous surface on its inner face for engaging conduit 2 in a flush manner in surface to surface relationship therewith, avoiding any abrading action, and thus, maintaining the outer surface of conduit 2 in an unbroken or uncracked state.

Spring 10 may be of various cross sectional character, such as rectangular, annular, and the like, but, as shown herein, is of a general ovate form, with the portions outwardly of the side faces of metal strip 1 being convex, as at 15, and with the interventing or connecting portions being in abutment against the confronting end edges of metal strip 1, as at 16, for tight engagement therewith, so that undesired movement of spring 10 circumferentially about loop 1' will be restrained. When clamp A is disposed upon conduit 2, the convex portion 15 of spring 10 engaging said conduit will be normally flattened resiliently thereagainst so as to maintain a steady, firm, reliable pressure against same, but not of sufficiently great force so as to damage conduit 2.

It is recognized that conduit 2 may be made of any suitable metal, or alloy, as is well-known in the art, such as, for example, aluminum, steel, stainless steel, etc. Spring 10 may also be formed of various metals having the desired characteristics, but, it has been found that stainless steel is the most desirable in view of its properties and in view of economy. With spring 10 being formed of stainless steel, it would be desirable that conduit 2 be likewise constructed of the same material so that no inadvertent galvanic action could develop therebetween. The properties of stainless steel are well known, and its non-corrosive character renders it most preferable for the present usage.

In view of the foregoing, it will thus be seen that spring 10 provides a resilient suspension for conduit 2 so as to protect same against the vibrational forces encountered during usage, such as through any uneven movement of the vehicle or reaction under impact of forces acting on the vehicle, whereby conduit 2 will at all times be maintained in a fully operative, protected condition, preventive of rupture, cracking, etc. Furthermore, due to the material of construction of spring 10, the same will form a cushion which is of all-purpose character, being equally usable under all types of operating conditions. Thus, the same will not lose its cushioning properties under the influence of relatively low temperatures such as with liquid oxygen, nor will the same tend to deteriorate or succumb under extreme high temperatures. Additionally, spring 10 will not disintegrate under nuclear radiation and will be inert or non-reactive with the myriad species of chemicals which may be encountered during use, such as from fuels or hydraulic fluids within the system incorporating conduit 2, as well as chemical compounds borne by the atmosphere in which the system is operating, as, for example, the salt from sea spray.

It will be noted that spring 10 may be easily mounted upon clamp A and removed therefrom should the same be desired and that the same may be most cheaply manufactured.

It should be understood that changes and modifications in the formation, construction, arrangement, and combination of the several parts of the conduit clamp cushion may be made and substituted for those herein shown and described without departing from the nature and principle of my invention.

Having thus described my invention, what I claim and desire to secure by Letters Patent is:

A conduit clamp comprising a loop-forming body for encircling disposition about a conduit, said loop-forming body being formed from a metallic flat strip stock, and a coiled spring disposed surroundingly of, and carried by, said loop-forming body, said spring being relatively closely coiled and of such cross section as to abut the edges of said loop-forming body and to project outwardly from the opposite faces thereof whereby upon engagement on a conduit the confronting projecting portion will be relatively flattened against the adjacent face of the conduit and thereby exert a maintaining pressure against the said conduit.

References Cited in the file of this patent
UNITED STATES PATENTS

| | | |
|---|---|---|
| 220,049 | Atwood | Sept. 30, 1879 |
| 928,284 | Selsor | July 20, 1909 |
| 1,947,969 | Browne | Feb. 20, 1934 |
| 2,709,558 | Young | May 31, 1955 |
| 2,767,946 | Weeks | Oct. 23, 1956 |
| 2,923,760 | Famely | Feb. 2, 1960 |

FOREIGN PATENTS

| | | |
|---|---|---|
| 357,400 | Great Britain | Sept. 24, 1931 |
| 487,153 | France | June 12, 1918 |
| 794,571 | Great Britain | May 7, 1958 |
| 1,165,528 | France | June 2, 1958 |